United States Patent [19]

Tucker

[11] Patent Number: 4,633,627
[45] Date of Patent: Jan. 6, 1987

[54] EARTH ANCHORS

[75] Inventor: Michael C. Tucker, Brisbane, Australia

[73] Assignee: Gearhart Australia Limited, Queensland, Australia

[21] Appl. No.: 649,551

[22] Filed: Sep. 11, 1984

[30] Foreign Application Priority Data

Sep. 14, 1983 [AU] Australia .............................. PG1404
Feb. 6, 1984 [AU] Australia .............................. PG3478

[51] Int. Cl.⁴ .......................... F16B 13/04; E04B 1/41
[52] U.S. Cl. ........................................ 52/162; 52/163; 52/166; 411/32; 411/340
[58] Field of Search .................................. 52/153–165, 52/166, 296, 704, 698, 707; 411/32, 33, 15, 63, 340, 344, 345, 368; 166/217

[56] References Cited

U.S. PATENT DOCUMENTS

| 734,373 | 7/1903 | Smith | 52/163 |
| 769,083 | 8/1904 | Hick | 52/162 |
| 772,515 | 10/1904 | Jackman | 52/162 |
| 795,649 | 7/1905 | Robinson | 52/163 |
| 999,786 | 8/1911 | Heyerly | 52/166 X |
| 1,564,069 | 12/1925 | Hoovens | 52/163 |
| 1,821,125 | 9/1931 | Thom | 52/163 X |
| 2,503,548 | 4/1950 | Damstra | 52/166 X |
| 3,022,873 | 2/1962 | Ondrejka | 52/155 X |
| 4,295,760 | 10/1981 | Warner | 411/33 X |

FOREIGN PATENT DOCUMENTS 2406391 8/1974 Fed. Rep. of Germany ...... 411/340

Primary Examiner—John E. Murtagh
Assistant Examiner—Richard Chilcot
Attorney, Agent, or Firm—Renner, Otto, Boiselle & Lyon

[57] ABSTRACT

An earth anchor comprising an insertable shank portion and a locking means for securing the anchor in an earth formation has one or more locking members captively associated with the insertable shank portion, the one or more locking members being either tiltable or rotatable relative to the shank whereby the insertable portion is inserted into a borehole in an earth formation and upon tensioning of the shank the one or more locking members wedgingly engage with the wall of the borehole to anchor the device within the borehole. The device has particular application as a means for suspending utility conduits and the like against the wall or floor of an underground excavation.

7 Claims, 18 Drawing Figures

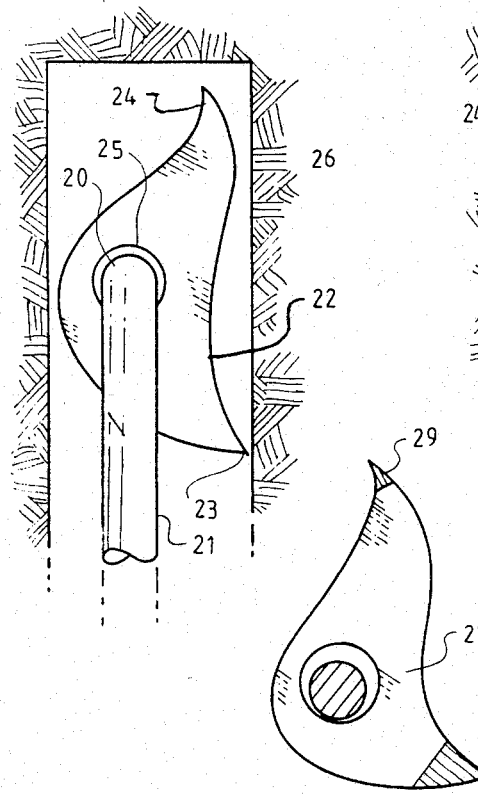
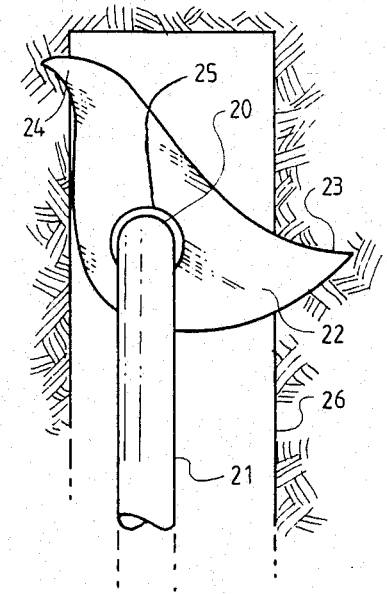
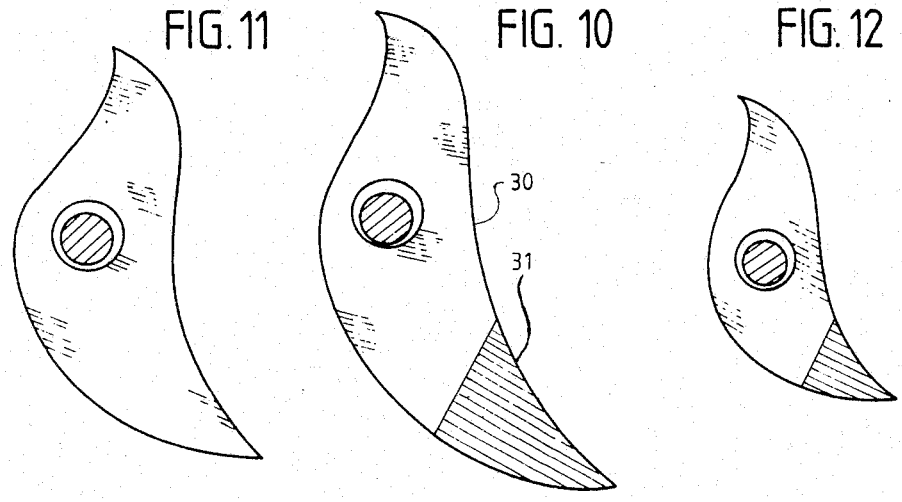

EARTH ANCHORS

This invention is concerned with improvements in devices for anchoring in an earth formation and, in particular, to a mechanical anchoring device.

There are many anchoring devices available for securing a member into an earth formation. These include rock bolts which may have a plain or deformed shank for securing in a borehole by a chemical or cementitious grout. Grouted rock bolts are probably the most widely used form of earth anchor in use today in direct reinforcing of earth formations or attachment of reinforcing members to the earth formations.

Although generally satisfactory for the purpose, chemically grouted anchors are expensive to install in both material and labour costs. Cementitious grouting is slightly less expensive but suffers the problem that initial anchoring strength is low until the cementitious grout is allowed to cure.

Various types of mechanical anchoring systems have been proposed to permit rapid installation with high initial load strengths.

Load strengths are generally measured by the tensile load required to obtain "pull out" i.e. substantial collapse or complete withdrawal from the borehole.

Of the mechanical anchoring devices available these include:

a split shank and wedge wherein an anchor member when driven under force to the end of a borehole causes a wedge to drive apart the split ends of the anchor shank to engage the wall of the borehole;

an expandable sleeve or collar which expands to engage the wall of the borehole when tension is applied to the anchor member;

longitudinally split tubes which are forced into a borehole under compression to reduce the tube diameter;

an expandable tube which is expanded under great pressure in a borehole until the tube wall frictionally engages the wall of the borehole.

All of the above mechanical anchoring systems suffer from one or more disadvantages, not the least of which is the high cost of each unit. Other disadvantages include lengthy installation times and a tendency to be useful only in a limited range of earth formations.

The present invention aims to overcome or alleviate the disadvantages of prior art mechanical earth anchoring systems and to provide an earth anchor which in inexpensive to manufacture and install.

According to one aspect of the invention there may be provided an anchor member for earth formations, said anchor member comprising:

an insertable shank for insertion into a borehole in an earth formation; and one or more locking members captively associated with said shank, said one or more locking members being tiltable relative to said shank to enable in use insertion into a borehold and upon tensioning of said shank to wedgingly engage with the wall of the borehole to resist withdrawal of the shank therefrom.

Preferably said one or more locking members are located intermediate the ends of the insertable shank.

Preferably said one or more locking members are located adjacent one end of said shank.

Preferably said anchor member includes at least two locking members mutually engageable to obtain a mechanical advantage in wedging engagement with the wall of the borehole.

Preferably said locking member includes an aperture through which portion of the anchor member passes.

Preferably said locking member comprises an annular shaped element.

Preferably said locking member comprises a generally elliptical shaped element.

According to another aspect of the invention there may be provided an anchor member for earth formations, said anchor member comprising an insertable shank for insertion into a borehole in an earth formation; and a wedge member rotatably mounted on said shank whereby said wedge member is rotatable relative to said shank to enable in use insertion into a borehole and upon tensioning of said shank to wedgingly engage with the wall of the borehole to resist withdrawal of the shank therefrom.

Preferably said wedge member comprises at least one tapered engaging end.

Most preferably said wedge member comprises opposed tapered engaging ends.

If required said anchor member may comprise in combination:

an insertable shank portion;

one or more locking members captively associated with said shank and tiltable relative thereto; and a wedge member rotatably mounted on said shank, said wedge member and said one or more locking members adapted in use to coact to obtain a mutual mechanical advantage to engage the wall of a borehole when said shank is tensioned.

Various preferred embodiments of the invention will now be described with reference to the accompanying drawings in which:

FIGS. 7-8 show other embodiments of the invention.

FIGS. 9-12 show variations in the shape of wedging members.

Figure 1:
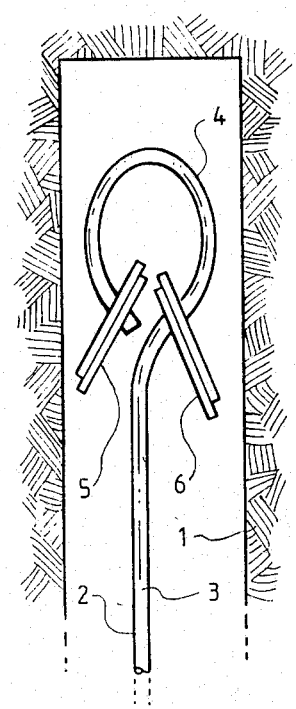
FIG. 1 shows a first embodiment during insertion

In FIG. 1, a borehole 1 is formed in an earth formation as shown. An anchoring member 2 having an insertable shank portion 3, is inserted into the borehole. The anchoring member includes a looped end 4 with annular metal washers 5 arranged on each side of looped end 4 in such a manner that when inserted into the borehole, the washers 5, 6 tilt downwardly to enable the arrangement to be inserted. The thickness of washers 5,6 and the central apertures therein are chosen to enable the washers to tilt as shown to permit insertion.

Once inserted to approximately the required depth, shank 3 is then withdrawn slightly causing the lower portions 7a and 7b of locking members or washers 5,6 to engage the side wall of borehole 1 such that the upper or inner portions 8a, 8b are brought into engagement. Continued tensioning of shank 3 causes the lower or outer portions 7a, 7b of locking members 5, 6 to bite into the wall of borehole 1 whilst the upper portion 8a acts as a support for portion 8b to provide a fulcrum for tilting movement of washer 6. Continued tilting of the washers 5, 6 causes a wedging engagement between the outer portions 7a, 7b and the wall of the borehole while the inner aperture in the washers wedgingly engages the looped portion 4 of the anchor member.

Figure 3:
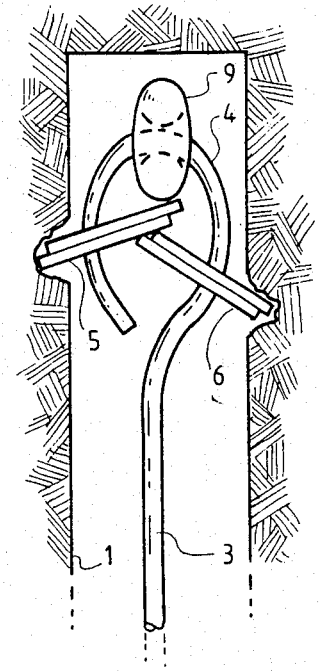
FIG. 3 shows a variation on the embodiments of FIGS. 1 and 2.

To assist in the support of the inner portions 8a, 8b, a simple ring member 9 as shown in FIG. 3 is clipped over the upper portion of loop 4 to limit the upward movement of the locking member assembly 5, 6 and to further force the outward tilting movement of portions 7i a, 7b.

In use, the assembly of FIG. 1 is simply pushed into a borehole to the desired depth and sharply retracted until portions 7a, 7b of washers 5, 6 respectively engage the borehole. The anchor member 2 may then be tensioned or otherwise secured into the borehole.

Figure 2:
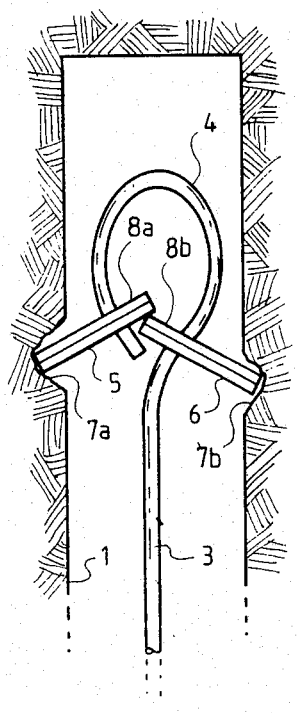
FIG. 2 shows the embodiment of FIG. 1 in a first engagement stage
Figure 4:
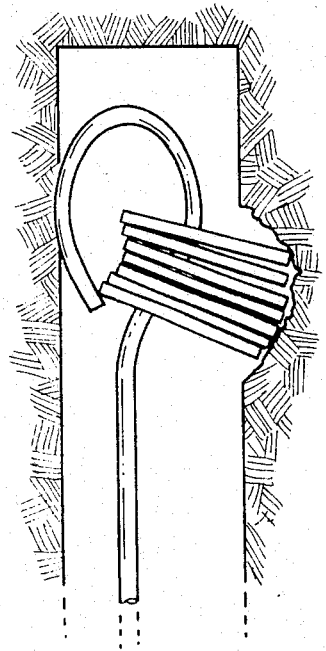
FIG. 4 shows yet a further variation on the embodiment of FIGS. 1-3.

FIG. 4 shows an alternative embodiment of FIGS. 1-3 wherein all of the washers or locking members 5 lie on one side of loop 4. Wedging engagement of members 5 forces the upper end of loop 4 into frictional engagement with the wall of borehole 1.

Figure 6:
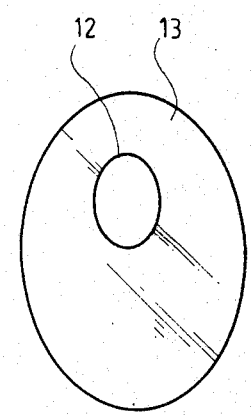
FIG. 6 shows the locking member of FIG. 5.
Figure 5:
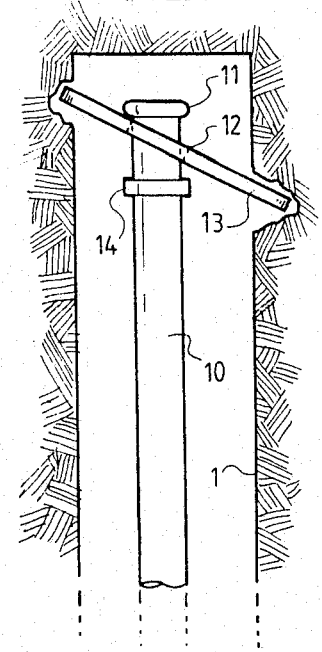
FIG. 5 shows a further embodiment of the invention.

FIG. 5 shows an alternative embodiment of FIGS. 1-4. At the upper end of shank 10 is a thickened portion or head 11 of greater diameter than the aperture 12 in locking member 13. Locking member 13 has a generally elliptical or circular aperture 12 as shown in FIG. 6 and a generally elliptical shape approximating the angular cross section of a circular borehole to enable insertion of the locking member having at least one dimension greater than the diameter of the borehole. A collar 14 is employed to retain locking member 13 in place during insertion in the borehole. Collar 14 may comprise a steel member or a plastics member or the like, merely sufficient to prevent locking member 13 from sliding down the shank of anchor member 10 during insertion.

FIG. 7 shows yet another embodiment of the invention. Rotatably mounted at the remote end 20 of the insertable shank of an anchor member 21 is a wedge member 22. The wedge member comprises a pair of opposed tapered ends 23, 24 and an aperture 25 through which the end 20 of the anchor member 21 passes. The aperture 25, although generally intermediate the tapered ends 23, 24 is offset from the two ends to provide a lever arm on what in effect is a double ended cam. FIG. 7 shows the anchor member being inserted into a borehole 26.

When tension is applied to the anchor member by, for example, a threaded nut on a threaded exposed end of the anchor member, wedge member 22 is caused to rotate by virtue of the lever arm generated by the off centre rotational axis.

FIG. 8 shows the wedge member 22 wedgingly engaged with the wall of borehole 26 after the shank of the anchor member 21 is fully tensioned. Tapered end 23 penetrates the wall of the borehole to a point where the resistance to penetration then causes the opposed end 24 to penetrate the wall of the borehole. It will be seen readily that overrotation (and thus release) of the wedge member is prevented by the penetration of opposed end 24 which provides a dynamic balance to the wedge member as tension on the anchor member shank is increased.

Depending on the nature and hardness of the earth formation, differing shapes of wedge member may be employed.

FIG. 9 shows for example a wedge member 27 for use in very hard rock masses having a rock mass strength of say greater than 10 MPa. As the degree of penetration will be limited compared to a softer rock mass, the wedge member may be shorter but with a greater lever arm to maximise the wedging action when the anchor member is tensioned. If required tapered ends 28, 29 may be pointed to increase the degree of penetration in the borehole. The pointed ends may be hardened or hard faced to further assist in penetration. In some cases, the tapered ends may be made of a softer metal or even a plastics material to enhance frictional contact against the wall of the borehole instead of relying on penetration.

FIG. 10 shows a wedge member suitable for softer earth formations such as coal. The lower end 31 is tapered on both pairs of opposed faces to give a very sharp point for ease of penetration. By making at least the lower portion of member 30 longer, it is possible to obtain a considerable degree of lateral penetration in to a wall of a borehole in a soft earth formation and ensure adequate anchoring. The upper end 32 may be pointed to enable penetration into the earth mass or it may be simply tapered to encourage a greater degree of penetration of opposed end 31.

FIGS. 11 and 12 show alternative shapes suitable for say soft and medium hardness rock masses having a rock mass strength less than 10 MPa.

Figure 13:
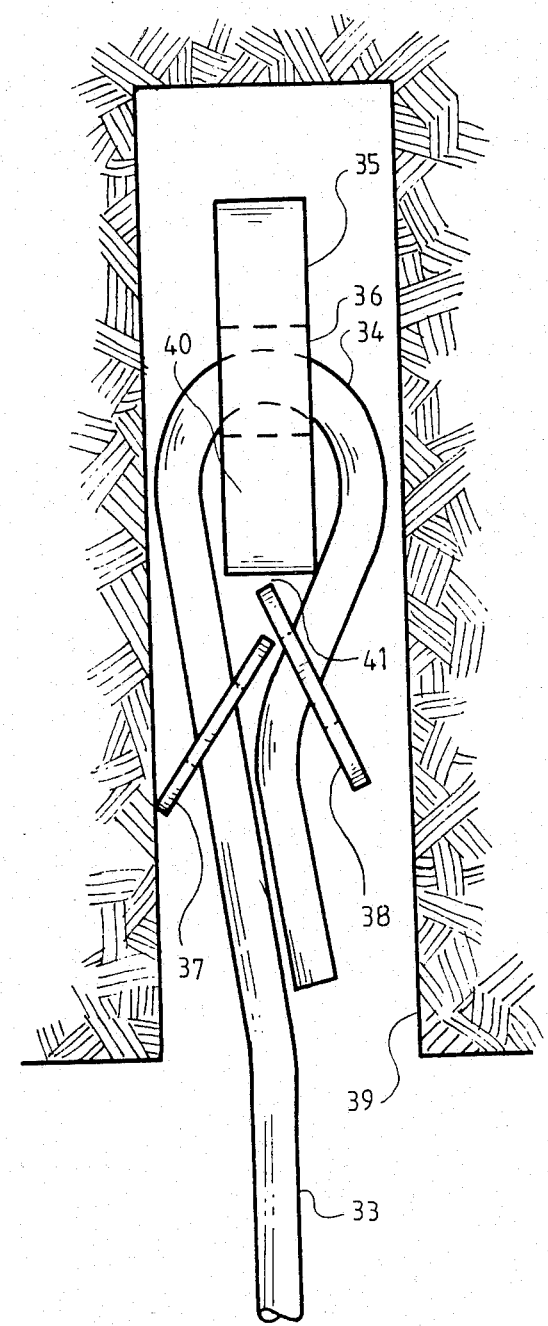
FIG. 13 shows a combination of a pair of locking members and a wedging member.

FIG. 13 shows yet another embodiment of the invention combining synergistically the effects of a rotatable wedge and tiltable locking members.

The remote end of the shank 33 of an anchor member comprises a loop 34. Rotatably mounted at the top of loop 34 is a wedge member 35 as generally illustrated in FIGS. 9-12. The wedge member is held captive for rotation by the loop 34 passing through aperture 36 in wedge member 35. A pair of annular steel washers 37, 38 are captively located on either side of loop 34.

As illustrated, the assembly is readily insertable in a borehole 39 simply by pushing the shank 33 upwardly. Preferably the borehole is drilled slightly longer than the length of the anchor assembly. The entire length of the anchor assembly is thrust into the borehole and then sharply jerked outwardly until the wedge and locking members engage with the borehole. The anchor member is then tensioned in a conventional manner e.g. by a nut on the free end of the anchor assembly.

A synergistic effect is obtained by the use of both the locking members and the wedge member. As tension is applied, the face 40 of the wedge engages against an edge 41 of washer 38 providing a tilting axis. Simultaneously washer 38 bears against an edge 42 of washer 37 to provide a tilting axis. The combined thrust of both washers in turn bears against face 40 of the wedge member thereby creating a mutually enhanced penetrating force on each of washers 37, 38 and the wedge member.

The following test results demonstrate the effectiveness of the invention.

An anchor member was constructed generally in accordance with the arrangement shown in FIG. 13. The anchor shank was constructed from 8 mm dia. hard drawn wire and the locking members comprised a pair of M16 hardened structural washers. A mild steel wedge member having the configuration shown in FIGS. 7, 8 was rotatably mounted on the end of the anchor shank.

The anchor member was then inserted into a 40 mm dia. borehole drilled into a block of 10 MPa concrete. The assembly locked into position after a 20 mm "pullback" and then the assembly was loaded with an "Enerpac" (Trade Mark) hydraulic rockbolt pull-out tester.

The following test data was obtained:

| LOAD | YIELD FROM INITIAL LOCK POSITION |
|---|---|
| 0 | 0 |
| 1 tonne | 20 mm |
| 1.5 tonne | 25 mm |
| 2 tonne | 30 mm |
| 3 tonne | 45 mm |
| 4 tonne | 60 mm |

Continued load application was found to cause progressive "ploughing" of the wedge/washers assembly over portion of the length of the borehole. The tensile strength of the shank of the anchor member was finally exceeded near the mouth of the borehole at a loading of just over 5 tonnes.

Anchoring devices according to the present invention are considered to have a greater element of safety over conventional anchoring systems such as split collar wedges, chemical and cementitious grouts since these will fail completely if the wall of the borehole deforms. The present invention however can maintain continuous engagement.

A further advantage of the present invention is that it may be used for temporary support and then removed later if required. By hammering or pushing the shank of the anchor back up the borehole, the wedge and/or locking members may be released from the borehole. A tubular member may then be pushed up the borehole to engage the members to prevent penetration upon withdrawal.

In use the present invention may be used with any form of anchor member i.e. tensionable rock bolts, wire rod or cable members or composite wire rod members as disclosed in our co-pending applications Nos. PF 4447, PF 6836 and PF 8432.

All that is required is that the anchor and/or locking members be first held captive in association with the anchor member during insertion and subsequently during loading or tensioning.

It is preferred that multiple locking members be employed to enhance load strength, the locking members being arranged together on one side in multiples opposed at 180° or regularly or randomly radially disposed relative to the borehole.

Preliminary tests conducted to date show that with a 10 mm diameter shank and opposed pairs of 30 mm washers in a configuration shown generally in FIG. 3, "pull out" load strengths exceeding 6 tonnes may be achieved. Similar values have been obtained with the arrangement of FIG. 6.

The load strengths of the anchors according to the invention are effectively instantaneous. All that is required is that the device is inserted into a borehole, sharply withdrawn to effect engagement and then loaded. In contrast to prior art systems, it is not necessary to carry out the additional steps of first inserting a grout cartridge, spinning or otherwise manipulating the anchor member in the borehole to mix the grout, waiting for curing and finally tensioning the unit. Alternatively it is not necessary to insert the anchor followed by a hammering or tensioning step to achieve anchoring in the earth formation.

The invention is applicable to any type of earth anchoring system, particularly those requiring a high initial load strength. If required, the system may be post-grouted as convenient to enhance the ultimate load strength.

In yet a further embodiment of the invention, the anchor member may comprise a plurality of locking members arranged at any suitable position or over substantially the entire length of the insertable portion of an anchor member shank. Simple and inexpensive plastics collars or the like may be employed to retain the locking members at a required axial spacing and/or radial arrangement on an insertable anchor shank.

A further advantage of the present invention resides in its ability to be engineered according to mechanical load requirements. Where high loads are required, thicker locking members may be employed or they may be fashioned from high tensile steel or the like.

In certain applications, e.g. coal mine pillars where ultimate removal of the anchor members may be required, the locking members may be engineered to provide a suitable "pull-out" load strength but, nevertheless, have an ultimate yield strength whereby removal is possible. By applying an excess tensile strength, the locking members may be caused to bend upwardly beyond an angle normal to the applied force thus permitting the entire anchor member to be withdrawn.

Figure 14:
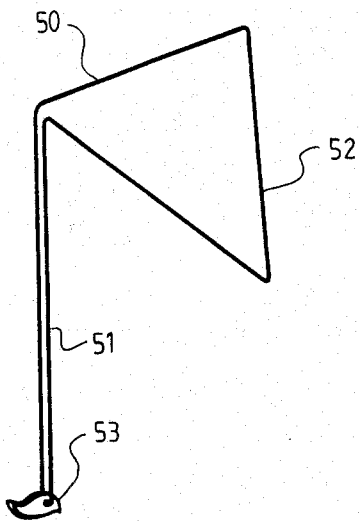
FIGS. 14-16 show aspects of an earth retaining system.
Figure 15:
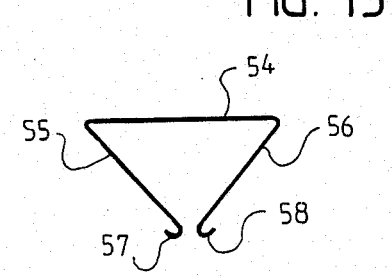
Figure 16:
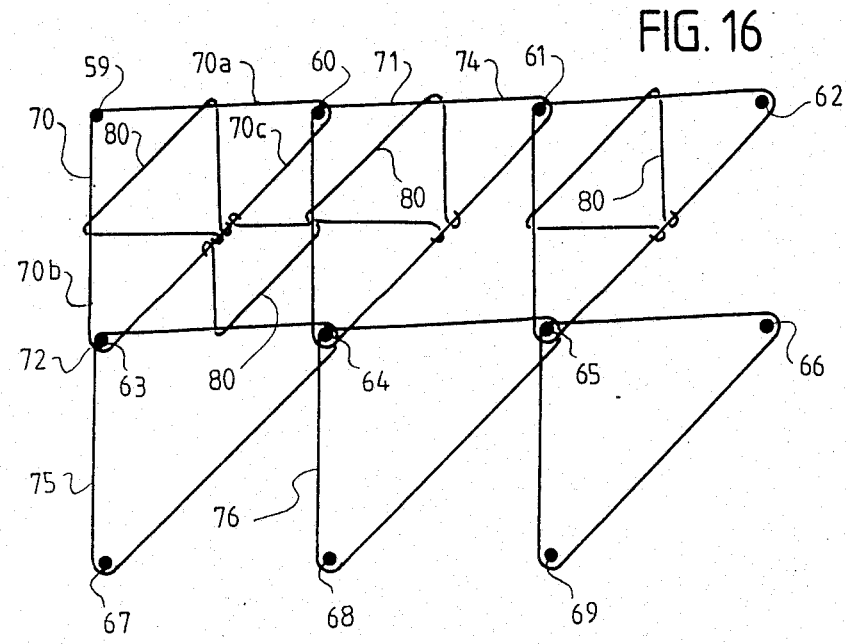

FIGS. 14-16 show further embodiments of the invention. FIG. 14 shows an alternative form of anchor member 50 having an insertable shank portion 51 and a restraining portion 52 in the form of a triangular loop having a plane normal to the shank 51. The anchor member 50 is suitably formed from mild steel rod or the like. At the free end of the shank portion 51 is a rotatable wedge member 53 of the type generally illustrated in FIGS. 7-12.

FIG. 15 illustrates a connecting member 54 comprising a generally triangular shape formed from mild steel rod or the like. The member 54 may be formed from the same diameter rod as the anchor member 50 of FIG. 14 or of a lesser diameter if required. The triangular shape is open at one corner and the free ends of sides 55, 56 are formed as hooks 57, 58 extending in a plane generally normal to the plane of the triangular shape.

FIG. 16 illustrates the manner in which the anchor members of FIG. 14 and the connecting member of FIG. 15 may be employed. A series of spaced boreholes 59, 69 are formed in an earth formation and then the shank of a first anchor member 70 is inserted and fixed into borehole 59. The opposed corners 71, 72 of the triangular restraining portion 73 are aligned over adjacent boreholes 60. The shank of a further anchor member 74 is then inserted into borehole 60 at the inner side of corner 71. The shank of anchor member 75 is inserted into borehole 63 to link with member 70 in a similar fashion. The shank of yet another anchor member 76 is then inserted into borehole 64 to link together the corners of anchor members 74 and 75. The procedure is repeated over the surface of an earth mass to form an interlinked mesh-like tensile member over the surface of the earth mass. The structure so formed comprises a reinforcing and confining structure of the type generally referred to in U.S. Pat. No. 4,413,928 and International Patent Applications PCT/Au No. 83/00077 and PCT/Au 83/00167 all by the present inventor. The free ends of meshlike structure represented at say boreholes 66–69 may be anchored to the earth formation by any suitable anchor means, such as a conventional rock bolt or preferably by an anchor member employing the mechanical wedge action according to the various aspects of this invention.

In regions where additional confinement of loose earth masses is required, the connector members of FIG. 15 may be employed. These connector members 80 may simply be slipped over the adjacent legs 70a, 70b of the triangular restraining portion of anchor 70 and then the hooked ends clipped over leg 70c. The connector members 80 may be clipped onto the restraining portions of the anchor members before anchoring in the earth mass or they may be connected after the initial mesh-like structure is formed.

It will be clear to a skilled addressee that the anchor member of FIG. 14 and the structure of FIG. 16 may employ anchoring means other than rotatable wedge 53. For example, the insertable portion 51 of FIG. 14 may be formed with free ends which may be anchored bychemical or cementitious grouts in a borehole.

Figure 18:
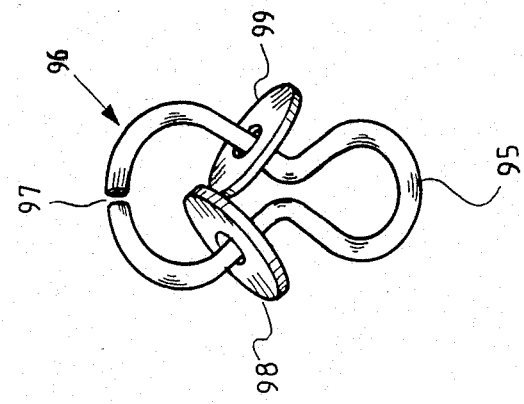
FIGS. 17 and 18 show other variations of earth anchors.
Figure 17:
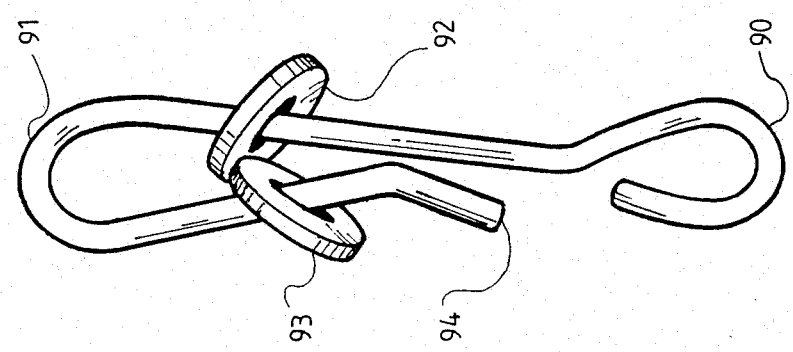

FIGS. 17 and 18 show adaptations of the invention for use as support members.

Where it is required to distribute utilities such as power, communications, compressed air, water and the like throughout mineshafts or tunnels, these must be distributed via cables, pipes and similar conduits. It is common practice to support such conduits at predetermined intervals by hook-like members suspended from rock bolts inserted in the roof or wall surface. Such rock bolts may be from one to two meters in length and necessitate a borehole of corresponding depth. The tensile capabilities of such rock bolts are greatly underutilized in applications for utility conduit support. In addition, considerable time is required to drill a borehole of suitable depth to receive the entire shank of the rock bolt. Accordingly, the prior art systems for utility conduit support are expensive and wasteful of both material and manpower resources.

The devices of FIGS. 17 and 18 are simple and inexpensive anchors which require a minimal borehole depth and provide quite adequate anchorage for the loads envisaged.

In FIG. 17, the anchor comprises a first looped end 90 and a second opposed elongate loop 91. Annular washers 92,93 are slipped over the free end 94 of elongate loop 91 and arranged generally as shown. The elongate loop 91 is then inserted into a borehole to a desired depth and withdrawn slightly to engage washers 92,93 with the wall of the borehole. Loop 90 is exposed from the borehole and provides a simple connection point from which to suspend utility conduits by a hook, wire or rope tie or the like.

FIG. 18 shows an alternative embodiment of the anchorable "hanger" device of FIG. 17. The hanger comprises a normally exposed loop portion 95 and the insertable portion 96 comprises a split loop formed by the free ends to define an aperture 97 having a width sufficient to enable washers 98,99 to be slipped over the opposing free ends of the loop 96 in the manner shown. The device operates in a manner substantially identical to that of FIG. 17.

Tests have shown that in reasonably sound coal seams a pull out force of 700–800 lb. is required to dislodge the anchor devices from a respective borehole. Anchoring devices of this type are thus very effective in achieving the aim of providing an inexpensive readily installed suspension support in earth formations.

It will be clear to a skilled addressee that many modifications and variations will be possible with the present invention without departing from the spirit and scope thereof.

I claim:

1. An earth anchor comprising an insertable shank portion for insertion into a borehole in an earth formation, said insertable shank portion having a looped end with spaced opposing sides; and at least one apertured disk-like locking member freely slidable and captively located on each opposing side with each said opposing side passing through an aperture in a respective said locking member, said at least one locking member on each opposing side being mutually engageable with the other at their respective inner ends to obtain a mechanical advantage when tension is applied to said shank portion to wedgingly engage their respective outer ends with the wall of said borehole.

2. An earth anchor as set forth in claim 1, wherein said at least one locking member includes an annular shaped element.

3. An earth anchor as set forth in claim 1, wherein said at least one locking member includes an elliptical shaped element.

4. An earth anchor as set forth in any one of claims 1–3, including a plurality of said locking members captively located on each opposing side of said looped end.

5. An earth anchor as set forth in claim 1, comprising a normally exposed portion opposite to said insertable shank portion, said normally exposed portion including connection means for connecting articles thereto.

6. An earth anchor as set forth in claim 5, wherein said connection means comprises a closed loop.

7. An earth anchor as set forth in claim 5, wherein said connection means comprises a hook member.

* * * * *